United States Patent
Yang et al.

(10) Patent No.: US 12,259,885 B2
(45) Date of Patent: Mar. 25, 2025

(54) QUERY OPTIMIZATION METHODS, APPARATUSES, AND SYSTEMS FOR SECURE MULTI-PARTY DATABASE

(71) Applicant: Alipay (Hangzhou) Information Technology Co., Ltd., Zhejiang (CN)

(72) Inventors: Yang Yang, Hangzhou (CN); Qunshan Huang, Hangzhou (CN); Jun Qi, Hangzhou (CN); Shunde Cao, Hangzhou (CN); Pu Duan, Hangzhou (CN); Jian Du, Hangzhou (CN); Qingkai Mao, Hangzhou (CN); Yang Zhao, Hangzhou (CN); Kefeng Yu, Zhejiang (CN); Lei Wang, Hangzhou (CN); Benyu Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/492,456

(22) Filed: Oct. 23, 2023

(65) Prior Publication Data
US 2024/0054129 A1 Feb. 15, 2024

Related U.S. Application Data

(63) Continuation of application No. PCT/CN2022/086531, filed on Apr. 13, 2022.

(30) Foreign Application Priority Data

Apr. 23, 2021 (CN) .......................... 202110443996.3

(51) Int. Cl.
*G06F 16/2453* (2019.01)
*H04L 9/06* (2006.01)

(52) U.S. Cl.
CPC .......... *G06F 16/24545* (2019.01); *H04L 9/06* (2013.01); *H04L 2209/46* (2013.01)

(58) Field of Classification Search
CPC ....................... H04L 2209/46; G06F 16/24545
See application file for complete search history.

(56) References Cited

U.S. PATENT DOCUMENTS

2006/0020573 A1* 1/2006 Galindo-Legaria ..........................
G06F 16/24526
2018/0196850 A1 7/2018 Schaeffer et al.
(Continued)

FOREIGN PATENT DOCUMENTS

CN 101739398 6/2010
CN 111737011 10/2020
(Continued)

OTHER PUBLICATIONS

Pattuk, E., Kantarcioglu, M., Ulusoy, H., Malin, B.. CheapSMC: A Framework to Minimize Secure Multiparty Computation Cost in the Cloud. In: Ranise, S., Swarup, V. (eds) Data and Applications Security and Privacy XXX. DBSec 2016. Lecture Notes in Computer Science(), vol. 9766. Springer, Cham. (Year: 2016).*
(Continued)

*Primary Examiner* — Kannan Shanmugasundaram
(74) *Attorney, Agent, or Firm* — Fish & Richardson P.C.

(57) ABSTRACT

Implementations of this specification provide query optimization methods, apparatuses, and systems for secure multi-party databases. In an implementation, a method includes: receiving a current query associated with a plurality of target database of a multi-party database system, generating a plurality of execution plans for the current query, determining, for each execution plan, a respective cost computation formula of a plurality of cost computation values for computing an execution cost of jointly executing the execution plan by the plurality of target databases, receiving a secure
(Continued)

computation result from each of a plurality of query engines corresponding to the plurality of target databases, and determining an optimal execution plan having a lowest cost value in the plurality of cost computation formulas based on the secure computation result.

20 Claims, 6 Drawing Sheets

(56) References Cited

U.S. PATENT DOCUMENTS

2018/0357427 A1 12/2018 Lindell et al.
2018/0365290 A1 12/2018 Kaushik et al.

FOREIGN PATENT DOCUMENTS

| CN | 111767304 | 10/2020 |
| CN | 112329072 | 2/2021 |
| CN | 112860738 | 5/2021 |

OTHER PUBLICATIONS cbcb.umd.edu [online], "Chapter 13: Query Optimization," available on or before Mar. 28, 2016, via Internet Archive: Wayback Machine URL <https://web.archive.org/web/20230000000000*/https://www.cbcb.umd.edu/confcour/Spring2014/CMSC424/query_optimization.pdf>, retrieved on Feb. 26, 2024, URL <https://www.cbcb.umd.edu/confcour/Spring2014/CMSC424/query_optimization.pdf>, 63 pages.

International Preliminary Report on Patentability in Appln. No. PCT/CN2022/086531, mailed on Nov. 2, 2023, 14 pages (with English translation).

International Search Report and Written Opinion in Appln. No. PCT/CN2022/086531, mailed on Jul. 8, 2022, 17 pages (with English translation).

Song et al., "Survey on AI powered new techniques for query processing and optimization," Journal of Frontiers of Computer Science & Technology, Jul. 1, 2020, 14(7):1081-1103 (with English Abstract).

* cited by examiner

QUERY OPTIMIZATION METHODS, APPARATUSES, AND SYSTEMS FOR SECURE MULTI-PARTY DATABASE

CROSS-REFERENCE TO RELATED APPLICATIONS

This application is a continuation of PCT Application No. PCT/CN2022/086531, filed on Apr. 13, 2022, which claims priority to Chinese Patent Application No. 202110443996.3, filed on Apr. 23, 2021, and each application is hereby incorporated by reference in its entirety.

TECHNICAL FIELD

One or more embodiments of this specification relate to the database field, and in particular, to query optimization methods and apparatuses for a secure multi-party database.

BACKGROUND

A database is a system in which data are organized, stored, and managed based on a specific data structure. In the current big data era, the Internet is full of massive data. The data have different sources, such as travel records, consumption records, browsed web pages, sent messages, etc., and are in different formats, such as text, images, sounds, etc. Storage, management, and query of the massive data impose higher requirements on the database.

To improve efficiency of data query in the database, query optimization is an important step in a data query process. Query optimization is used to find the most efficient execution path from various possible query execution paths. In this process, distribution/statistical information of the data in the database needs to be used.

However, in a database system collaboratively constructed by a plurality of parties, distribution/statistical information of data may disclose data privacy of a certain party. Therefore, conventional query optimization solutions usually cannot be applied to database systems with privacy protection needs.

Therefore, it is desirable to provide an improved solution to perform efficient query optimization for the database systems with privacy protection needs.

SUMMARY

One or more embodiments of this specification describe query optimization methods, apparatuses, and systems for a secure multi-party database, so that efficient query optimization can be performed while security of data privacy in a database of each party is ensured.

According to a first aspect, a query optimization method for a secure multi-party database is provided, and includes the following: A central device receives a current query, and generates a plurality of execution plans for the current query, where the current query involves a plurality of target databases; the central device determines a corresponding cost computation formula for each execution plan, where the cost computation formula is used to compute execution costs needed for jointly executing the execution plan by the plurality of target databases; a plurality of query engines corresponding to the plurality of target databases perform secure multi-party computation (MPC) by using a target secure computation method corresponding to the cost computation formula, to obtain a secure computation result; and the central device determines an optimal execution plan with the lowest cost value in cost computation formulas based on the secure computation result.

In some embodiments, the generating a plurality of execution plans for the current query specifically includes the following: The current query is parsed to obtain a corresponding relational expression, where the relational expression includes several logical operations that need to be performed for the current query; and the plurality of execution plans are generated based on the relational expression, where different execution plans include different combination methods or different combination sequences of the several logical operations.

In some embodiments, the plurality of execution plans include a first execution plan, and the first execution plan includes a plurality of logical operations; and that the central device determines a corresponding cost computation formula for each execution plan specifically includes the following: For each of the plurality of logical operations, the central device determines operation costs of the logical operation based on an operation method of a multi-party joint operation corresponding to the logical operation; and obtains a first cost computation formula corresponding to the first execution plan based on operation costs corresponding to each logical operation.

In some further examples, the plurality of logical operations can include a join operation on a first table in a first database and a second table in a second database, and a multi-party joint operation corresponding to the join operation is a private set intersection (PSI) operation between the first database and the second database. In this case, the central device can determine operation costs of the join operation based on an operation method of the PSI operation.

Still further, in some examples, the PSI operation uses a circuit-based PSI protocol. In this case, the operation costs of the join operation are directly proportional to a smaller value in a quantity of rows in the first table and a quantity of rows in the second table.

In some implementations, the execution costs include respective computing resource costs of the plurality of target databases and costs of communication between the plurality of target databases.

In some implementations, the method further includes the following: The central device determines the target secure computation method based on each cost computation formula, and sends the target secure computation method to the plurality of query engines.

In some other implementations, the method further includes the following: The central device sends each cost computation formula to the plurality of query engines; and the plurality of query engines determine the target secure computation method based on a predetermined secure computation policy.

In different embodiments, the cost computation formula can include at least one of the following operations: a summation operation, a multiplication operation, an operation to extract the minimum value, and an operation to extract the maximum value. Correspondingly, the target secure computation method includes at least one of the following: a secure multi-party summation operation, a secure multi-party multiplication operation, a secure multi-party operation to extract the minimum value, and a secure multi-party operation to extract the maximum value.

In some implementations, the secure computation result is an index number of a cost computation formula with the lowest cost value in the cost computation formulas. In this case, the central device can determine an execution plan corresponding to the index number as the optimal execution plan.

In some embodiments in the implementations, that a plurality of query engines perform secure multi-party computation (MPC), to obtain a secure computation result specifically includes the following: A cryptographic result of each cost computation formula is computed through MPC; and secure comparison is performed on each cryptographic result, to obtain the index number.

Further, in some examples, the cryptographic result is a cost value shard computed through secret sharing. In this case, the index number can be determined based on the cost value shard corresponding to each cost computation formula by using a secure comparison protocol.

In some other implementations, the secure computation result is a cryptographic result of a cost value of each cost computation formula. In this case, the central device determines the optimal execution plan based on each cryptographic result.

Further, in some examples, the cryptographic result is a cost value shard computed through secret sharing. In this case, the central device can aggregate cost value shards submitted by the plurality of query engines for the same execution plan, to obtain a cost value of the same execution plan; and determine the optimal execution plan by comparing cost values of the execution plans.

In some other examples, the cryptographic result is a ciphertext cost value encrypted by using a public key of the computing device. In this case, the central device can decrypt the ciphertext cost value by using a private key corresponding to the public key, to obtain a plaintext cost value; and determine the optimal execution plan by comparing plaintext cost values of the execution plans.

According to a second aspect, a query optimization method for a secure multi-party database is provided, and is performed by a central device. The method includes the following: A current query is received, and a plurality of execution plans are generated for the current query, where the current query involves a plurality of target databases; a corresponding cost computation formula is determined for each execution plan, where the cost computation formula is used to compute execution costs needed for jointly executing the execution plan by the plurality of target databases; a secure computation result is received from a plurality of query engines corresponding to the plurality of target databases, where the secure computation result is obtained by the plurality of query engines by performing secure multi-party computation (MPC) by using a target secure computation method corresponding to the cost computation formula; and an optimal execution plan with the lowest cost value in cost computation formulas is determined based on the secure computation result.

According to a third aspect, a secure multi-party database system for query optimization is provided, and includes a central device and at least two databases connected to the central device. The central device is configured to receive a current query and generate a plurality of execution plans for the current query, where the current query involves a plurality of target databases in the at least two databases. The central device is further configured to determine a corresponding cost computation formula for each execution plan, where the cost computation formula is used to compute execution costs needed for jointly executing the execution plan by the plurality of target databases. A plurality of query engines corresponding to the plurality of target databases are configured to perform secure multi-party computation (MPC) by using a target secure computation method corresponding to the cost computation formula, to obtain a secure computation result. The central device is further configured to determine an optimal execution plan with the lowest cost value in cost computation formulas based on the secure computation result.

According to a fourth aspect, a query optimization apparatus for a secure multi-party database is provided, and is deployed in a central device in a secure multi-party database system. The apparatus includes: an execution plan generation unit, configured to receive a current query, and generate a plurality of execution plans for the current query, where the current query involves a plurality of target databases; a cost formula determination unit, configured to determine a corresponding cost computation formula for each execution plan, where the cost computation formula is used to compute execution costs needed for jointly executing the execution plan by the plurality of target databases; a result receiving unit, configured to receive a secure computation result from a plurality of query engines corresponding to the plurality of target databases, where the secure computation result is obtained by the plurality of query engines by performing secure multi-party computation (MPC) by using a target secure computation method corresponding to the cost computation formula; and an optimal plan determination unit, configured to determine an optimal execution plan with the lowest cost value in cost computation formulas based on the secure computation result.

According to a fifth aspect, a computing device is provided, and includes a memory and a processor. The memory stores executable code, and when the processor executes the executable code, the method according to the second aspect is implemented.

According to the methods and the apparatuses provided in the embodiments of this specification, for a secure multi-party database, in a query optimization process, for each alternative execution plan, the central device analyzes costs of jointly executing the execution plan by a plurality of query engines, to obtain a cost computation formula, so that the plurality of query engines collaboratively compute a secure result corresponding to the cost computation formula through secure multi-party computation (MPC), and then determines an optimal execution plan based on the secure result. In an entire computation process, private data in each database are not disclosed, and privacy protection needs of data of each party in the secure multi-party database can be satisfied.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can derive other drawings from these accompanying drawings without creative efforts.

DESCRIPTION OF EMBODIMENTS

The solutions provided in this specification are described below with reference to the accompanying drawings.

It is known to a person skilled in the art that a database usually includes a query engine and a data storage area. The data storage area stores actual data. The query engine is configured to perform query-related computation, including parsing of a query request, query optimization, query execution, etc. In a query process performed by the query engine, query optimization is an important step.

Figure 1:
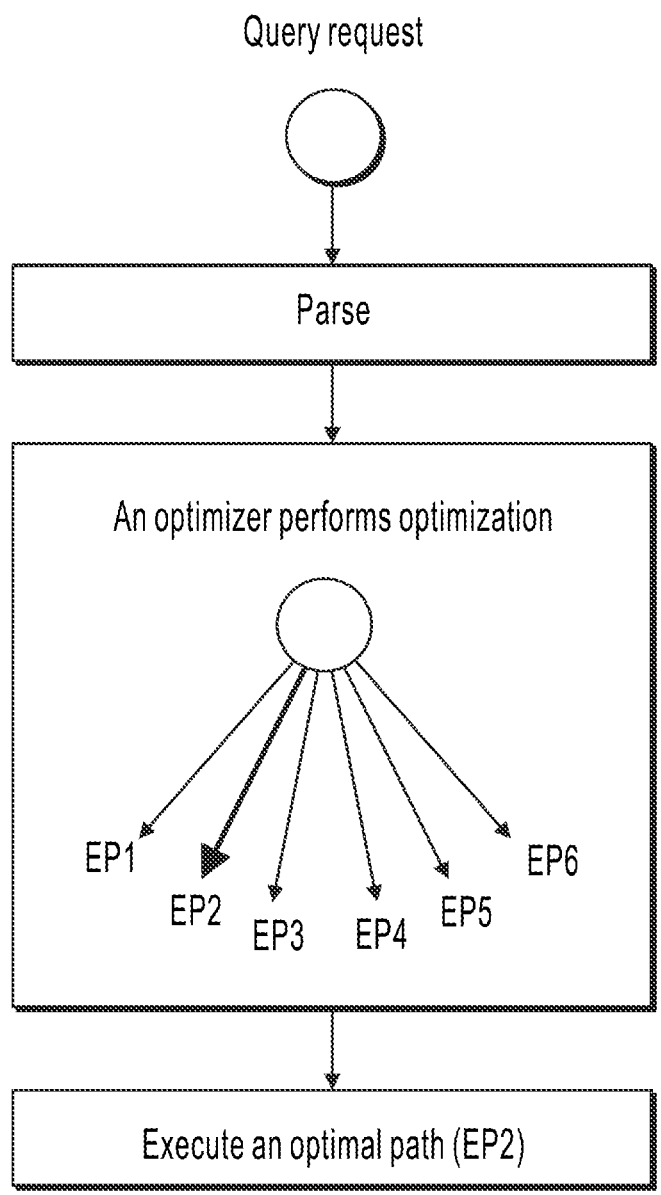
FIG. 1 illustrates an example of a data query process for a database.

FIG. 1 illustrates an example of a data query process for a database. The query process is usually performed by using a query engine. As shown in the figure, when a query request is received, the query engine first parses the query request, and then performs query optimization by using an optimizer. In this phase, the optimizer generates a plurality of execution plans (EPs), also referred to as query plans or query paths, for the query request. Each execution plan represents an operation method for executing the query request. The optimizer then can evaluate execution efficiency of each execution plan based on a plurality of considerations, such as frequency of disk read by the execution plan, a time needed, computational complexity, etc. These factors can be collectively referred to as execution costs. Usually, the optimizer ultimately selects an execution plan with lowest execution costs as an optimal query path. For example, in FIG. 1, the optimizer selects a query path EP2 shown by a bold line from a plurality of query paths EP1 to EP6. Then, the query engine can execute the current query request based on the optimal query path.

Analysis of execution costs of an execution plan by the optimizer usually depends on a distribution status and/or a statistical status of data in the data storage area. For example, assume that a current query request is requesting to read names of teachers aged over 40 in a music department from teacher data table A. In this case, a certain execution plan may include a selection operation of selecting a tuple whose attribute value of an attribute "age" is greater than 40 from table A. When execution costs of the selection operation are estimated, a distribution status of attribute values of the attribute "age" in table A is considered, for example, a mean, a distribution histogram, etc. of the attribute values.

It should be understood that the distribution/statistical status of data is private data. Currently, in various multi-party interaction scenarios, protection of private data becomes a basic requirement and an important concern for data security. The same is true in the database field.

Figure 2:
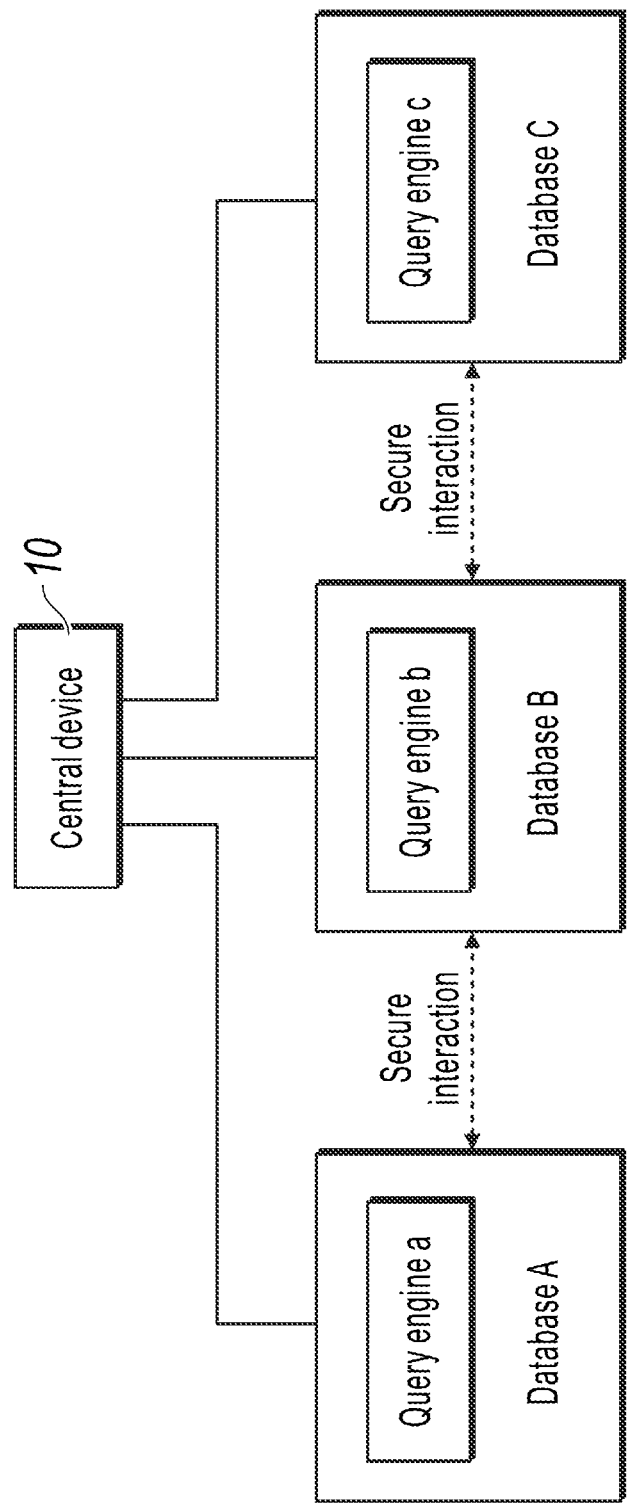
FIG. 2 is an architectural diagram illustrating a secure multi-party database system, according to some embodiments.

Specifically, in the database field, a plurality of parties also need to jointly construct a database system by using respective data. To alleviate a security problem and a privacy protection problem of a database system constructed by a plurality of parties, a concept of secure multi-party database is provided. FIG. 2 is an architectural diagram illustrating a secure multi-party database system, according to some embodiments.

As shown in FIG. 2, the secure multi-party database system includes a central device 10 and a plurality of participant databases. A database A, a database B, and a database C are shown as examples, and the databases have corresponding query engines a, b, and c. The central device 10 is configured to receive a query request, analyze the query request, generate a query task, and distribute the query task to the query engines. The query engines perform a joint query based on the query task, and a final result is aggregated to the central device 10, to uniformly provide a data query service to outside.

It is worthwhile to note that although some existing distributed database systems also include a plurality of databases, the databases are deployed only in different physical devices, and usually still belong to the same organization. Therefore, no privacy problem needs to be considered between the databases. In the secure multi-party database system shown in FIG. 2, the databases A, B, and C can belong to different organizations, and each organization can store private data of the organization in a data storage area of a corresponding database. For example, the database A can be a database of a payment platform, and stores user payment records of the payment platform; and the database B can be a database of a bank, and stores transaction details data of the bank. As such, in a process of performing a joint query by the query engines, when the databases interact with each other, data security needs to be ensured, and it needs to be ensured that private data of the party are not disclosed.

Query optimization is a challenge for the secure multi-party database system shown in FIG. 2. In a conventional query optimization process, private data such as a distribution/statistical status of data, etc. are used, and consequently it is difficult to satisfy privacy protection needs of the secure multi-party database.

Figure 3:
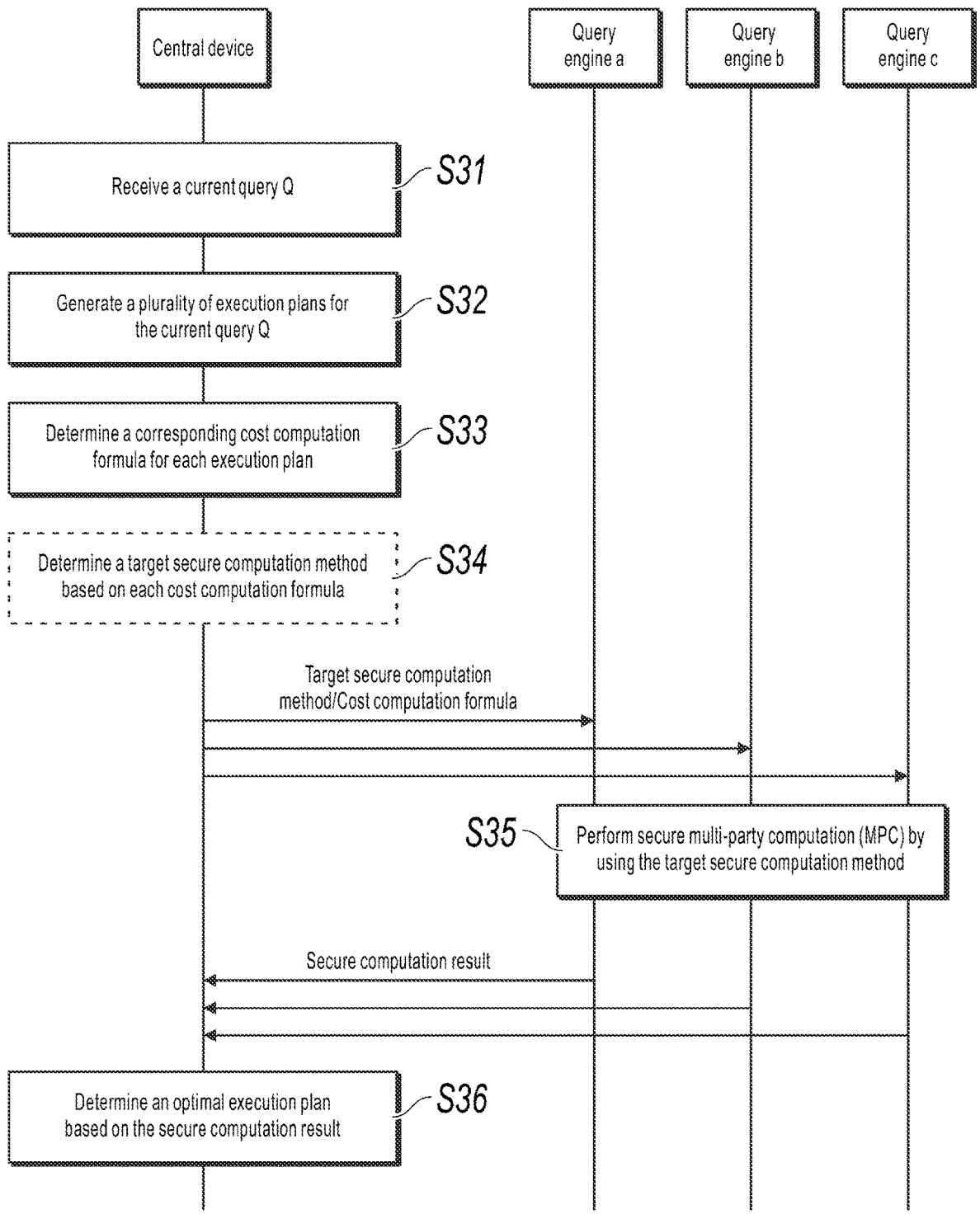
FIG. 3 is a flowchart illustrating query optimization for a secure multi-party database, according to some embodiments.

Therefore, this specification describes several embodiments of query optimization for a scenario of a secure multi-party database. FIG. 3 is a flowchart illustrating query optimization for a secure multi-party database, according to some embodiments. A central device and databases A, B, and C in FIG. 3 can correspond to those shown in FIG. 2. A specific execution process of the procedure in FIG. 3 is described below with reference to specific embodiments.

First, in step 31, the central device receives a current query Q. The current query Q can be a query sent by a user client in a secure multi-party database system, or can be a query sent by a holder of a certain database in a database system. Implementations are not limited here.

In some typical embodiments, the current query Q is implemented by using a structured query language (SQL). Certainly, in some other embodiments, the current query Q can alternatively be implemented in another corresponding language format depending on a data structure used and a query language supported by the database system.

In some embodiments, the current query Q involves a plurality of databases, referred to as target databases.

For example, in Example 1 of querying a teacher, assume that the database A stores table A, and age statistics of the teacher are recorded; and the database B stores table B, and department statistics of the teacher are recorded. Assume that the current query Q is requesting to query, based on table A and table B, names of teachers aged over 40 in a music department. In this case, the involved target databases include the databases A and B.

For another example, in Example 2 of querying a user id, assume that the databases A, B, and C respectively store user information tables A, B, and C, and the current query Q is requesting to query users with the same id in the three data tables. More specifically, the current query Q can be represented as the following SQL query statement:

Select A.id from A, B, C
Where A.id=B.id and B.id=C.id

In Example 2, the involved target databases are the databases A, B, and C.

It should be understood that usually, each database can submit metadata information of the database to the central device in advance. The metadata information describes a data table stored in the database, an attribute item recorded in the database, etc. As such, the central device can determine the involved target database based on the metadata information and a data table specified in the current query.

Then, in step 32, the central device generates a plurality of execution plans for the current query.

In some embodiments, the central device can parse the current query Q by using a conventional method, and obtain a corresponding relational expression based on a parsing result. Specifically, parsing of the query Q can include lexical analysis and syntax analysis. Through syntax analysis, a query statement can be converted into an equivalent relational expression. The relational expression includes several logical operations that need to be performed for the current query, such as a selection operation based on an attribute condition, a join operation on two data sets, etc. Then, extension is performed based on the relational expression, to generate the plurality of EPs. Different execution plans can include different combination methods or different combination sequences of the several logical operations. In some embodiments, the execution plan can be represented as a form of a logical tree. One node corresponds to one logical operation, and a relative sequence of logical operations is shown by a connection path between nodes.

In a conventional technology, a plurality of extension principles or equivalence principles exist. The relational expression can be extended by using these principles, to obtain a plurality of specific execution plans. Specifically, common extension principles can include the following examples:

$$\sigma_{\theta_1 \wedge \theta_2}(E) = \sigma_{\theta_1}(\sigma_{\theta_2}(E)) \qquad (a):$$

$$\sigma_{\theta_1}(\sigma_{n_2}(E)) = \sigma_{\theta_2}(\sigma_{\theta_1}(E)) \qquad (b):$$

$$(E_1 \bowtie E_2) \bowtie E_3 = E_1 \bowtie (E_2 \bowtie E_3) \qquad (c):$$

In descriptions of the principle (a), a selection operation $\sigma$ is performed by imposing two conditions $\theta_1$ and $\theta_2$ on data set E, which can be implemented by sequentially imposing the two conditions $\theta_1$ and $\theta_2$. In descriptions of the principle (b), a result obtained by first imposing a condition $\theta_1$ on data set E for selection and then imposing a condition $\theta_2$ for selection is equal to a result obtained by first imposing the condition $\theta_2$ and then imposing the condition $\theta_1$. In descriptions of the principle (c), when data sets $E_1$, $E_2$, and $E_3$ are joined, a result obtained by first performing a join operation $\bowtie$ on $E_1$ and $E_2$ and then joining $E_3$ is equal to a result obtained by first joining $E_2$ and $E_3$ and then joining $E_1$.

It should be understood that a plurality of extension principles or equivalence principles are aggregated in the existing technology, and are not listed one by one here. By using these principles, a plurality of equivalent replacements, arrangements, and combinations of the logical operations in the relational expression can be made, to obtain a plurality of equivalent EPs through extension.

For example, in the previous example of querying a user id, a relational expression can include a join operation on the three data tables A, B, and C. Based on the equivalence principle (c), at least the following three execution plans can be obtained through extension:

EP1: A join operation is first performed on table A and table B, and then a result of the join operation and table C are joined;

EP2: A join operation is first performed on table B and table C, and then a result of the join operation and table A are joined; and EP3: A join operation is first performed on table A and table C, and then a result of the join operation and table B are joined.

Based on the plurality of obtained execution plans, then, in step 33, the central device determines a corresponding cost computation formula for each execution plan. The cost computation formula can also be referred to as a cost function, and is used to compute execution costs corresponding to the execution plan. However, a difference from a conventional technology is that in a secure multi-party database system, once any execution plan is determined as an optimal query path, the execution path is subsequently jointly executed by the plurality of target databases by using a secure method of privacy protection. Therefore, for any execution plan, execution costs needed for jointly executing the execution plan by the plurality of target databases need to be computed by using a corresponding cost computation formula. In some embodiments, the execution costs include at least respective computing resource costs of the plurality of target databases and costs of communication between the plurality of target databases in a multi-party joint execution process.

Specifically, assume that any execution plan EPi includes a plurality of logical operations $O_1 O_2 \ldots O_n$. In this case, for any logical operation Oi, the central device determines operation costs of the logical operation Oi based on an operation method of a multi-party joint operation corresponding to the logical operation Oi; and then obtains a cost computation formula CFi corresponding to the execution plan EPi based on operation costs corresponding to each logical operation and a relationship between logical operations in the execution plan EPi.

The first execution plan EP1 in the three execution plans obtained through query for the user id is used as an example for description. As described above, EP1 includes two steps of logical operations: The first step is a join operation on table A and table B, and the second step is a join operation on the result of the join operation in the first step and table C. A multi-party joint operation corresponding to a join operation involving two databases is a private set intersection (PSI) operation between the two databases. Therefore, the central device determines operation costs of the join operation in the first step based on an operation method of a PSI operation between the database A and the database B. Similarly, operation costs of the join operation in the second step are determined based on an operation method of a PSI operation between the databases A, B, and C, and then a cost computation formula CF1 of EP1 is obtained.

More specifically, there can be a plurality of operation methods for performing a PSI operation between a plurality of databases. For example, the PSI operation is performed by using a double encryption method, the PSI operation is performed by using a circuit-based PSI protocol, etc. Operation costs of various operation methods can be different.

In some examples, when the database A and the database B perform a PSI operation between table A and table B by using a circuit-based PSI protocol, it is estimated that operation costs of the PSI operation are directly proportional to a smaller value in a quantity |A| of rows in table A and a quantity |B| of rows in table B, that is, min(|A|, |B|). The operation costs are obtained based on computational complexity of the used PSI protocol, and are an overall measurement of computing resources and communication costs that are needed by the database A and the database B. Similarly, when the same PSI protocol is used for the logical operation in the second step in EP1, operation costs of the logical operation are min(min(|A|, |B|), |C|).

Therefore, it can be obtained that the cost computation formula CF1 corresponding to the execution plan EP1 is as follows:

$$CF1=\min(|A|,|B|)+\min(\min(|A|,|B|,|C|))=\min(|A|,|B|)+\min(|A|,|B|,|C|) \quad (1)$$

Similarly, a cost computation formula CF2 corresponding to the execution plan EP2 is as follows:

$$CF2=\min(|B|,|C|)+\min(|A|,|B|,|C|) \quad (2)$$

It is worthwhile to note that the previous specific cost computation formulas are merely examples. In some other examples, the alternative execution plan can include other logical operations, such as a selection operation, a combination operation, etc. that are based on an attribute value. Correspondingly, each logical operation can have corresponding operation methods of a plurality of multi-party joint operations, and therefore there are different operation cost estimates. As such, an obtained cost computation formula can have various computation forms. For example, in addition to the operation to extract the minimum value, the summation operation, etc. that are shown as examples in the formulas (1) and (2), other cost computation formulas may include other operations, such as an operation to extract the maximum value, a multiplication operation, etc. Implementations are not listed one by one here.

In some embodiments, after determining each cost computation formula corresponding to each execution plan, the central device determines a target secure computation method based on each cost computation formula in step 34. The target secure computation method is a method in which a plurality of query engines corresponding to the plurality of involved target databases can securely and jointly perform cost computation. Depending on an operation type included in the cost computation formula, the target secure computation method can include several existing secure multi-party computation (MPC) methods.

For example, the cost computation formula shown in the formula (1) includes a summation operation and an operation to extract the minimum value. Therefore, the central device can determine that the target secure computation method that should be used by the plurality of query engines includes a secure multi-party summation operation and a secure multi-party operation to extract the minimum value. When the cost computation formula includes, for example, a multiplication operation and an operation to extract the maximum value, the target secure computation method correspondingly needs to include a secure multi-party multiplication operation, a secure multi-party operation to extract the maximum value, etc. The central device can further specify a specific protocol used for various secure multi-party operations, such as a protocol for performing secure summation through secret sharing, a protocol for performing secure multiplication through homomorphic encryption, etc.

After determining the target secure computation method, the central device can send the target secure computation method to the plurality of query engines for direct use by the plurality of query engines.

In some other embodiments, the central device can directly send each cost computation formula to the plurality of query engines. The plurality of query engines can determine, based on a pre-agreed or specified secure computation policy, a target secure computation method that should be used. For example, the secure computation policy can be preconfigured in each query engine in a form of a configuration file, and can include an agreement on a secure operation protocol that should be used for various operations that may be included in the cost computation formula. As such, the query engines can determine a target secure computation method corresponding to each cost computation formula based on the secure computation policy.

In the plurality of previous methods, the plurality of query engines in the plurality of target databases obtain or determine the target secure computation method that should be used. Therefore, then, in step 35, the plurality of query engines perform secure multi-party computation (MPC) by using the target secure computation method, to obtain a secure computation result, and return the secure computation result to the central device; and in step 36, the central device determines an optimal execution plan with the lowest cost value in cost computation formulas based on the secure computation result.

There can be a plurality of implementations for steps 35 and 36.

Figure 4:
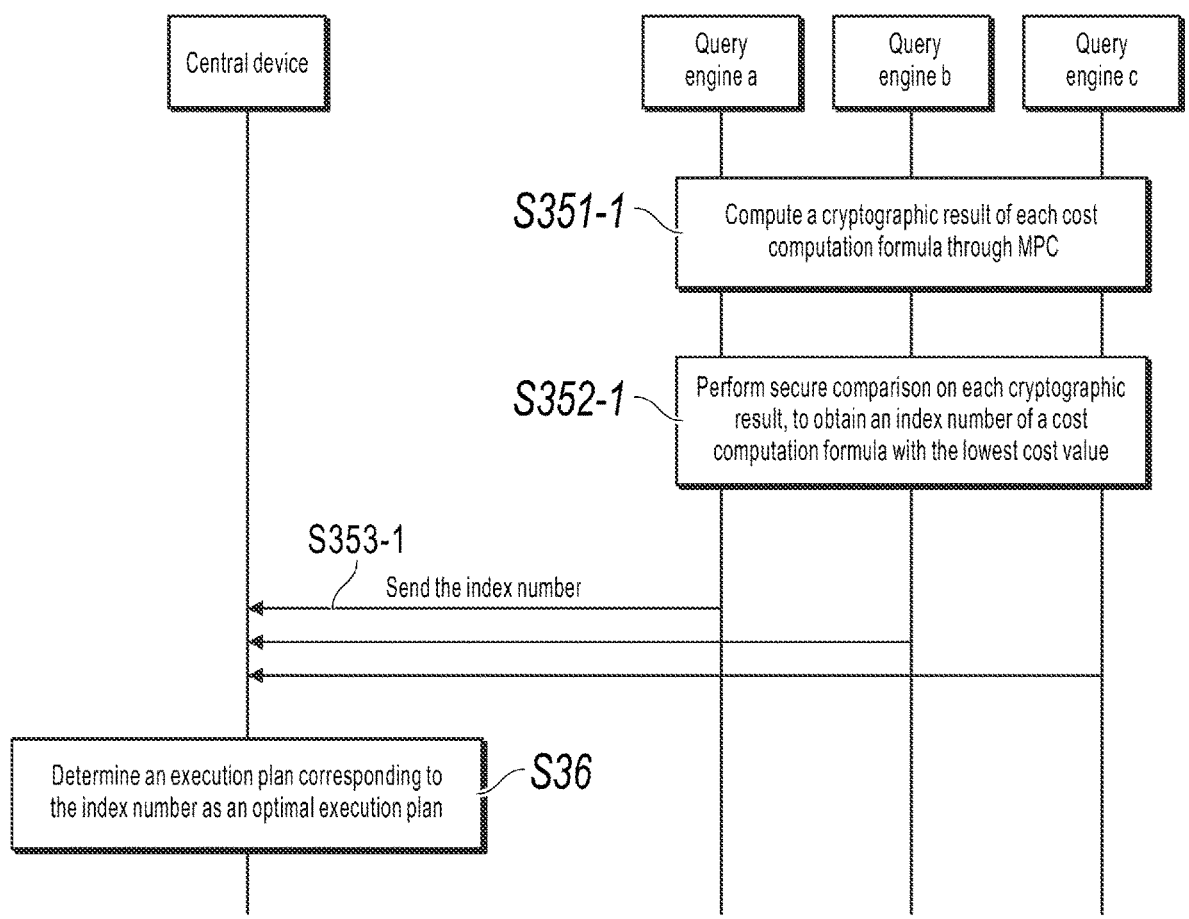
FIG. 4 is a schematic diagram illustrating secure multi-party computation of a query engine, according to some implementations.

FIG. 4 is a schematic diagram illustrating secure multi-party computation of a query engine, according to some implementations. In the embodiments in FIG. 4, the secure computation result returned by the query engines to the central device is an index number of a cost computation formula with the lowest cost value in the cost computation formulas. Therefore, in step 351-1, each query engine computes a cryptographic result of each cost computation formula through MPC. Then, in step 352-1, each query engine performs secure comparison on each cryptographic result, to obtain the index number of the cost computation formula with the lowest cost value.

Specifically, in some embodiments, in step 351-1, each query engine computes the cryptographic result, namely, a cost value shard computed through secret sharing, of each cost computation formula by using a secret sharing-based MPC method. For example, for the cost computation formula CF1, a query engine a computes a cost value shard <cost1>A, a query engine b computes a cost value shard <cost1>B, and a query engine c computes a cost value shard <cost1>C. Only when the three shards are combined, a cost value cost1 of the cost computation formula CF1 can be restored, and each party cannot obtain privacy information of another party based on a shard of the party. Similar processing can be performed for other cost computation formulas. Then, in step 352-1, each query engine determines the index number based on the cost value shard corresponding to each cost computation formula by using a secure comparison protocol. There are already some secure comparison protocols that are applicable to secure comparison performed on the sum of shards based on the shard through secret sharing. If such a secure comparison protocol is used for two groups of shards, a sequence number of a shard group with a smaller sum can be directly returned and obtained. As such, groups of cost value shards corresponding to the cost computation formulas are compared by using such a secure comparison protocol, and the index number of the cost computation formula with the lowest cost value can be obtained.

For example, secure multi-party computation is performed on the above-mentioned cost computation formulas CF1 and CF2. If the quantity |A| of rows in table A is less than the quantity of rows in table B and a quantity of rows in table C, an index number 1 of the cost computation formula CF1 can be directly returned through secure comparison.

In some other examples, the cryptographic result obtained in step 351-1 can be another form of cryptographic result, such as a homomorphic encryption form. Then, in step 352-1, each query engine can directly obtain the index number of the cost computation formula with the lowest cost value by using an available secure comparison protocol in this form.

Therefore, in step 353-1, each query engine or one of the query engines returns the index number to the central device.

Then, in step 36, the central device directly determines the execution plan corresponding to the index number as the optimal execution plan. For example, still in the previous example of querying a user id, if the central device receives the index number 1 in this step, the execution plan EP1 can be determined as the optimal execution plan.

It can be seen that in the implementations shown in FIG. 4, the index number with the lowest cost value is directly obtained through secure multi-party computation. In an entire computation process, the index number is only plaintext, and each query engine and the central device cannot obtain any private data plaintext of another party, to achieve very strong privacy protection strength.

Figure 5:
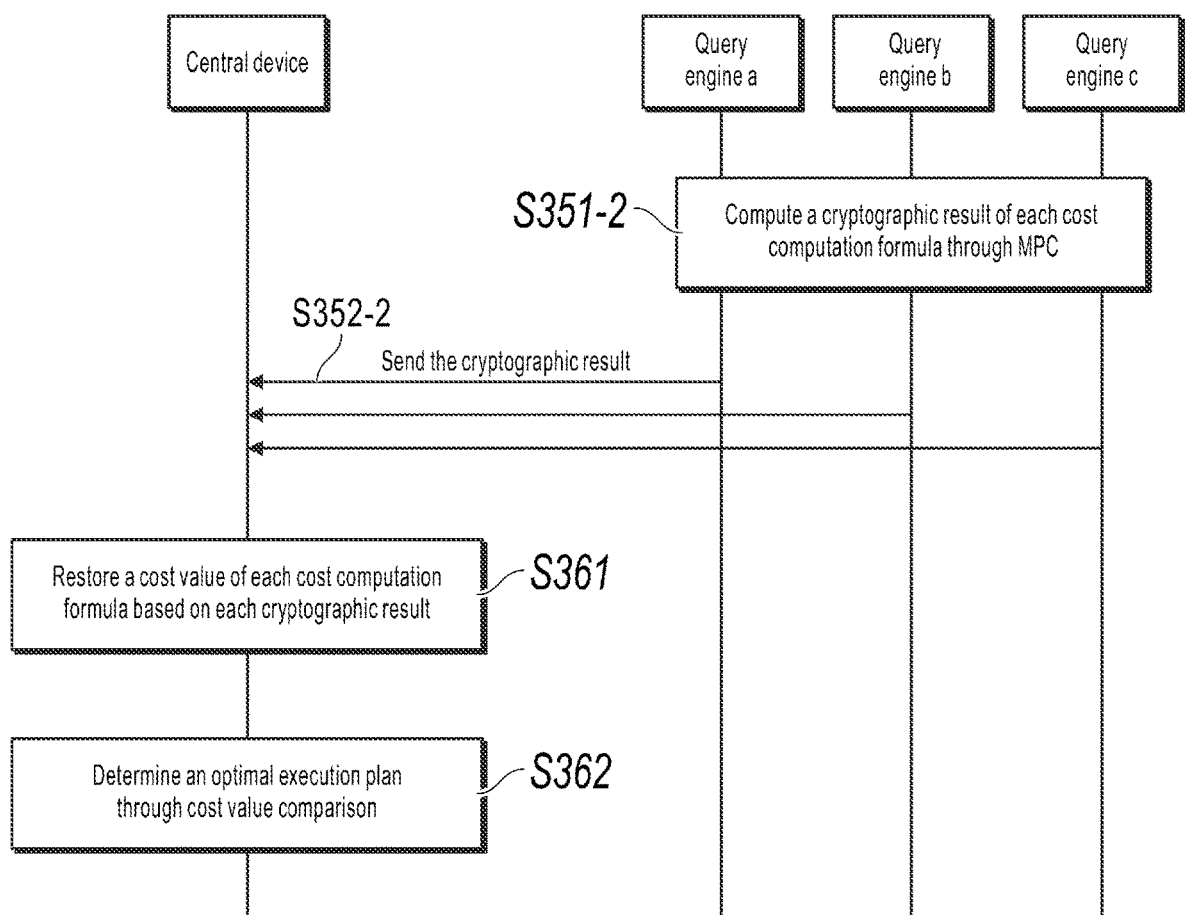
FIG. 5 is a schematic diagram illustrating secure multi-party computation of a query engine, according to some other implementations.

FIG. 5 is a schematic diagram illustrating secure multi-party computation of a query engine, according to some other implementations. In the embodiments in FIG. 5, the query engine returns a cryptographic result of the cost computation formula to the central device. Specifically, in step 351-2, each query engine computes a cryptographic result of each cost computation formula through MPC. A specific execution process of this step can be similar to 351-1 in FIG. 4. The cryptographic result can be a cost value shard obtained through secret sharing, a ciphertext result of homomorphic encryption, or another encrypted form. Then, in step 352-2, each query engine returns the cryptographic result obtained by the query engine to the central device.

Correspondingly, the central device determines the optimal execution plan based on each cryptographic result returned by each query engine. Specifically, in step 361, the central device restores a cost value of each cost computation formula based on each cryptographic result; and in step 362, determines the optimal execution plan through cost value comparison.

Specifically, in some examples, the cryptographic result is a cost value shard computed through secret sharing. Correspondingly, in step 361, the central device aggregates cost value shards submitted by the plurality of query engines for the same execution plan, to obtain a cost value of the same execution plan; and in step 362, determines the optimal execution plan by comparing cost values of the execution plans.

In some other examples, the cryptographic result is a ciphertext cost value encrypted by using a public key of the computing device. In this case, in step 361, the central device can decrypt the ciphertext cost value by using a private key corresponding to the public key, to obtain a plaintext cost value; and in step 362, determine the optimal execution plan by comparing plaintext cost values of the execution plans.

Therefore, it can be seen that in the implementations in FIG. 5, the query engines aggregate cryptographic results to the central device, and the central device determines the optimal execution plan based on an aggregated result. In the computation process, each query engine still cannot determine private data of another party, and the central device can determine only a final cost value, and cannot determine private data in each database. Therefore, basic privacy protection needs can be satisfied. In addition, centralized computation has higher computational efficiency than secure multi-party comparison. Therefore, when the central device is a trusted device, the implementations in FIG. 5 can be used.

In conclusion, in some embodiments of this specification, for a secure multi-party database, in a query optimization process, for each alternative execution plan, the central device analyzes costs of jointly executing the execution plan by a plurality of query engines, to obtain a cost computation formula, so that the plurality of query engines collaboratively compute a secure result corresponding to the cost computation formula through secure multi-party computation (MPC), and then determines an optimal execution plan based on the secure result. In an entire computation process, private data in each database are not disclosed, and privacy protection needs of data of each party in the secure multi-party database can be satisfied.

According to some embodiments in another aspect, this specification provides a secure multi-party database system for query optimization, including a central device and at least two databases connected to the central device. An architecture of the secure multi-party database system can be shown in FIG. 2. To implement query optimization, the secure multi-party database system is configured as follows: The central device is configured to receive a current query and generate a plurality of execution plans for the current query, where the current query involves a plurality of target databases in the at least two databases. The central device is further configured to determine a corresponding cost computation formula for each execution plan, where the cost computation formula is used to compute execution costs needed for jointly executing the execution plan by the plurality of target databases. A plurality of query engines corresponding to the plurality of target databases are configured to perform secure multi-party computation (MPC) by using a target secure computation method corresponding to the cost computation formula, to obtain a secure computation result. The central device is further configured to determine an optimal execution plan with the lowest cost value in cost computation formulas based on the secure computation result.

Figure 6:
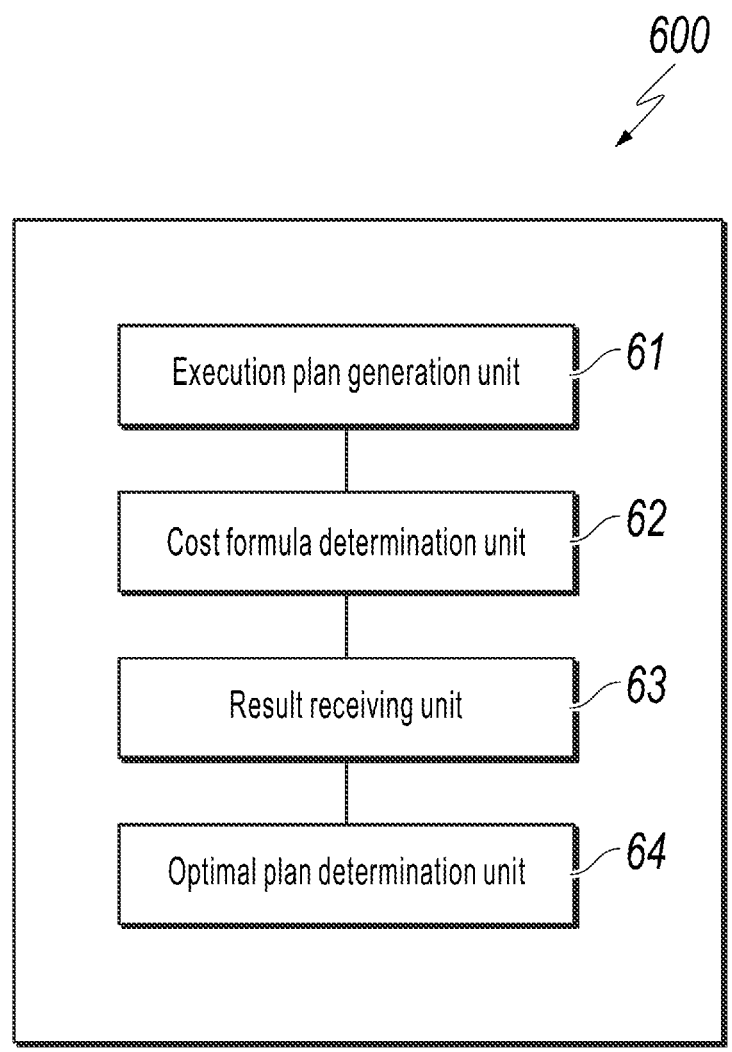
FIG. 6 is a schematic diagram illustrating a structure of a query optimization apparatus deployed in a central device.

According to some embodiments in still another aspect, embodiments of this specification further provide a query optimization apparatus for a secure multi-party database, deployed in a central device in a secure multi-party database system. The central device can be embodied as any computing device, platform, or cluster with a computing and processing capability. FIG. σ is a schematic diagram illustrating a structure of a query optimization apparatus deployed in a central device. As shown in FIG. 6, the query optimization apparatus 600 includes: an execution plan generation unit 61, configured to receive a current query, and generate a plurality of execution plans for the current query, where the current query involves a plurality of target databases; a cost formula determination unit 62, configured to determine a corresponding cost computation formula for each execution plan, where the cost computation formula is used to compute execution costs needed for jointly executing the execution plan by the plurality of target databases; a result receiving unit 63, configured to receive a secure computation result from a plurality of query engines corresponding to the plurality of target databases, where the secure computation result is obtained by the plurality of query engines by performing secure multi-party computation (MPC) by using a target secure computation method corresponding to the cost computation formula; and an optimal plan determination unit 64, configured to determine an optimal execution plan with the lowest cost value in cost computation formulas based on the secure computation result.

In some embodiments, the execution costs include respective computing resource costs of the plurality of target databases and costs of communication between the plurality of target databases.

According to some embodiments, the apparatus 600 can further include a computation method determination unit (not shown), configured to determine the target secure computation method based on each cost computation formula and send the target secure computation method to the plurality of query engines.

In some implementations, the secure computation result received by the result receiving unit 63 is an index number of a cost computation formula with the lowest cost value in the cost computation formulas; and the optimal plan determination unit 64 is configured to determine an execution plan corresponding to the index number as the optimal execution plan.

In some other implementations, the secure computation result received by the result receiving unit 63 is a cryptographic result of a cost value of each cost computation formula; and the optimal plan determination unit 64 is configured to determine the optimal execution plan based on each cryptographic result.

Further, in some embodiments, the cryptographic result is a cost value shard computed through secret sharing; and the optimal plan determination unit 64 is configured to aggregate cost value shards submitted by the plurality of query engines for the same execution plan, to obtain a cost value of the same execution plan; and determine the optimal execution plan by comparing cost values of the execution plans.

In some other embodiments, the cryptographic result is a ciphertext cost value encrypted by using a public key of the computing device; and the optimal plan determination unit 64 is configured to decrypt the ciphertext cost value by using a private key corresponding to the public key, to obtain a plaintext cost value; and determine the optimal execution plan by comparing plaintext cost values of the execution plans.

According to some embodiments in another aspect, a computer-readable storage medium is further provided. The computer-readable storage medium stores a computer program, and when the computer program is executed in a computer, the computer is enabled to perform the method described with reference to FIG. 3.

According to some embodiments in still another aspect, a computing device is further provided, and includes a memory and a processor. The memory stores executable code, and when the processor executes the executable code, the method described with reference to FIG. 3 is implemented.

A person skilled in the art should be aware that in the above-mentioned one or more examples, functions described in this specification can be implemented by hardware, software, firmware, or any combination thereof. When implemented by using software, these functions can be stored in a computer-readable medium or transmitted as one or more instructions or code on a computer-readable medium.

The above-mentioned specific implementations further describe in detail the objectives, technical solutions, and beneficial effects of this specification. It should be understood that the descriptions above are merely specific implementations of this specification and are not intended to limit the protection scope of this specification. Any modifications, equivalent replacements, or improvements made on the basis of the technical solutions of this specification shall fall within the protection scope of this specification.

What is claimed is:

1. A computer-implemented method, comprising:
receiving, by a central device of a multi-party database system, a current query associated with a plurality of target databases of the multi-party database system;
generating, by the central device, a plurality of execution plans for the current query;
determining, by the central device for each execution plan, a respective cost computation formula of a plurality of cost computation formulas for computing an execution cost of jointly executing the execution plan by the plurality of target databases;
receiving, by the central device, a secure computation result from each of a plurality of query engines corresponding to the plurality of target databases, wherein the secure computation result is obtained by performing secure multi-party computation (MPC) based on a target secure computation method corresponding to the respective cost computation formula; and
determining, by the central device, an optimal execution plan having a lowest cost value in the plurality of cost computation formulas based on a cryptographic result of a cost value of each of the plurality of cost computation formulas.

2. The computer-implemented method according to claim 1, wherein the execution cost comprises computing resource costs of the plurality of target databases and costs of communications between the plurality of target databases.

3. The computer-implemented method according to claim 1, further comprising:
determining, by the central device, the target secure computation method based on the plurality of cost computation formulas; and
sending, by the central device, the target secure computation method to the plurality of query engines.

4. The computer-implemented method according to claim 1, wherein the secure computation result is an index number of a cost computation formula with the lowest cost value in the plurality of cost computation formulas; and wherein
determining the optimal execution plan having the lowest cost value comprises:
determining an execution plan corresponding to the index number as the optimal execution plan.

5. The computer-implemented method according to claim 1, wherein the secure computation result is
the cryptographic result of each of the plurality of cost computation formulas.

6. The computer-implemented method according to claim 5, wherein the cryptographic result is a cost value shard computed based on secret sharing; and wherein
determining the optimal execution plan comprises:
aggregating a plurality of cost value shards sent by the plurality of query engines for a same execution plan of the plurality of execution plans to obtain a cost value of the same execution plan; and
determining the optimal execution plan by comparing cost values of the plurality of execution plans.

7. The computer-implemented method according to claim 5, wherein the cryptographic result is a ciphertext cost value encrypted based on a public key of the central device; and wherein determining the optimal execution plan comprises:

decrypting the ciphertext cost value based on a private key corresponding to the public key, to obtain a plaintext cost value; and determining the optimal execution plan by comparing plaintext cost values of the plurality of execution plans.

8. A non-transitory, computer-readable medium storing one or more instructions executable by a computer system to perform operations comprising:

receiving, by a central device of a multi-party database system, a current query associated with a plurality of target databases of the multi-party database system;

generating, by the central device, a plurality of execution plans for the current query;

determining, by the central device for each execution plan, a respective cost computation formula of a plurality of cost computation formulas for computing an execution cost of jointly executing the execution plan by the plurality of target databases;

receiving, by the central device, a secure computation result from each of a plurality of query engines corresponding to the plurality of target databases, wherein the secure computation result is obtained by performing secure multi-party computation (MPC) based on a target secure computation method corresponding to the respective cost computation formula; and determining, by the central device, an optimal execution plan having a lowest cost value in the plurality of cost computation formulas based on a cryptographic result of a cost value of each of the plurality of cost computation formulas.

9. The non-transitory, computer-readable medium according to claim 8, wherein the execution cost comprises computing resource costs of the plurality of target databases and costs of communications between the plurality of target databases.

10. The non-transitory, computer-readable medium according to claim 8, the operations further comprising:

determining, by the central device, the target secure computation method based on the plurality of cost computation formulas; and sending, by the central device, the target secure computation method to the plurality of query engines.

11. The non-transitory, computer-readable medium according to claim 8, wherein the secure computation result is an index number of a cost computation formula with the lowest cost value in the plurality of cost computation formulas; and wherein determining the optimal execution plan having the lowest cost value comprises:

determining an execution plan corresponding to the index number as the optimal execution plan.

12. The non-transitory, computer-readable medium according to claim 8, wherein the secure computation result is the cryptographic result of each of the plurality of cost computation formulas.

13. The non-transitory, computer-readable medium according to claim 12, wherein the cryptographic result is a cost value shard computed based on secret sharing; and wherein determining the optimal execution plan comprises:

aggregating a plurality of cost value shards sent by the plurality of query engines for a same execution plan of the plurality of execution plans to obtain a cost value of the same execution plan; and determining the optimal execution plan by comparing cost values of the plurality of execution plans.

14. The non-transitory, computer-readable medium according to claim 12, wherein the cryptographic result is a ciphertext cost value encrypted based on a public key of the central device; and wherein determining the optimal execution plan comprises:

decrypting the ciphertext cost value based on a private key corresponding to the public key, to obtain a plaintext cost value; and determining the optimal execution plan by comparing plaintext cost values of the plurality of execution plans.

15. A central device of a multi-party database system, comprising:

one or more processors; and one or more computer memory devices interoperably coupled with the one or more processors and storing programming instructions for execution by the one or more processors to perform operations comprising:

receiving a current query associated with a plurality of target databases of the multi-party database system;

generating a plurality of execution plans for the current query;

determining, for each execution plan, a respective cost computation formula of a plurality of cost computation formulas for computing an execution cost of jointly executing the execution plan by the plurality of target databases;

receiving a secure computation result from each of a plurality of query engines corresponding to the plurality of target databases, wherein the secure computation result is obtained by performing secure multi-party computation (MPC) based on a target secure computation method corresponding to the respective cost computation formula; and determining an optimal execution plan having a lowest cost value in the plurality of cost computation formulas based on a cryptographic result of a cost value of each of the plurality of cost computation formulas.

16. The central device according to claim 15, wherein the execution cost comprises computing resource costs of the plurality of target databases and costs of communications between the plurality of target databases.

17. The central device according to claim 15, the operations further comprising:

determining the target secure computation method based on the plurality of cost computation formulas; and sending the target secure computation method to the plurality of query engines.

18. The central device according to claim 15, wherein the secure computation result is an index number of a cost computation formula with the lowest cost value in the plurality of cost computation formulas; and wherein determining the optimal execution plan having the lowest cost value comprises:

determining an execution plan corresponding to the index number as the optimal execution plan.

19. The central device according to claim 15, wherein the secure computation result is
the cryptographic result of each of the plurality of cost computation formulas.

20. The central device according to claim 19, wherein the cryptographic result is a cost value shard computed based on secret sharing; and wherein
determining the optimal execution plan comprises:
aggregating a plurality of cost value shards sent by the plurality of query engines for a same execution plan of the plurality of execution plans to obtain a cost value of the same execution plan; and
determining the optimal execution plan by comparing cost values of the plurality of execution plans.

* * * * *